United States Patent
Shotey et al.

(10) Patent No.: US 8,558,110 B1
(45) Date of Patent: Oct. 15, 2013

(54) MULTI-USE ELECTRICAL BOX

(75) Inventors: Marcus J. Shotey, Scottsdale, AZ (US);
Gabor Budahazi, Scottsdale, AZ (US);
John Klein, Gilbert, AZ (US); Thomas A. Miserendino, Gilbert, AZ (US);
Jeffrey P. Baldwin, Phoenix, AZ (US);
Richard L. Cleghorn, Tempe, AZ (US)

(73) Assignee: Hubbell Incorporated, Shelton, CT (US)

( * ) Notice: Subject to any disclaimer, the term of this patent is extended or adjusted under 35 U.S.C. 154(b) by 231 days.

(21) Appl. No.: 12/897,244

(22) Filed: Oct. 4, 2010

Related U.S. Application Data

(63) Continuation-in-part of application No. 12/366,086, filed on Feb. 5, 2009, now Pat. No. 7,910,826.

(60) Provisional application No. 61/248,337, filed on Oct. 2, 2009.

(51) Int. Cl.
*H02G 3/08* (2006.01)

(52) U.S. Cl.
USPC ............... 174/53; 174/50; 174/54; 174/58; 174/59; 439/535; 220/3.5; 220/3.6; 220/4.02

(58) Field of Classification Search
USPC .............. 174/50, 53, 54, 58, 59, 64, 520; 220/3.6, 3.92, 3.94, 3.2, 3.3, 3.5, 3.7, 220/3.9, 4.02, 23.83, 500, 501; 439/535, 439/536, 949; 248/906; 361/679.01, 752
See application file for complete search history.

(56) References Cited

U.S. PATENT DOCUMENTS

| | | | |
|---|---|---|---|
| 1,875,101 A * | 8/1932 | Morrell | 174/57 |
| 2,425,545 A | 8/1947 | Lefebre | |
| 2,458,153 A | 1/1949 | Festge | |
| 2,606,586 A | 8/1952 | Hill | |
| 2,757,817 A | 4/1954 | Egan | |
| 2,875,915 A | 3/1959 | Buckels | |
| 2,916,733 A | 12/1959 | Hirsch | |
| 3,449,706 A | 6/1969 | Carissimi | |
| 3,952,908 A | 4/1976 | Carson | |
| 4,063,660 A | 12/1977 | Ware | |
| 4,307,264 A | 12/1981 | Hess | |
| 4,335,271 A | 6/1982 | Haslbeck | |
| 4,365,108 A | 12/1982 | Bright | |
| 4,634,015 A | 1/1987 | Taylor | |
| 4,634,212 A * | 1/1987 | Boundy et al. | 439/535 |
| 4,803,307 A | 2/1989 | Shotey | |
| 4,925,045 A | 5/1990 | Logsdon | |
| 4,988,832 A | 1/1991 | Shotey | |
| 5,042,673 A | 8/1991 | McShane | |
| 5,072,911 A | 12/1991 | Logsdon | |
| 5,142,102 A | 8/1992 | Michie | |
| 5,257,487 A | 11/1993 | Bantz et al. | |

(Continued)

*Primary Examiner* — Angel R Estrada
*Assistant Examiner* — Dimary Lopez
(74) *Attorney, Agent, or Firm* — Mark S. Bicks; Alfred N. Goodman

(57) ABSTRACT

An electrical box including a peripheral wall defining an outer perimeter and having a first end opposite a second end along a central axis, a first opening in the first end, a second opening in the second end, a dividing wall located between the first opening and the second opening, and wherein the first opening is arranged to secure a first electrical device on a first side of a structural wall and the second opening is arranged to secure a second electrical device on a second side of the structural wall.

20 Claims, 3 Drawing Sheets

(56) References Cited

U.S. PATENT DOCUMENTS

| | | | | |
|---|---|---|---|---|
| 5,289,934 | A | 3/1994 | Smith et al. | |
| 5,527,993 | A | 6/1996 | Shotey et al. | |
| 5,562,222 | A | 10/1996 | Jordan et al. | |
| 5,594,207 | A | 1/1997 | Fabian et al. | |
| 5,668,350 | A | 9/1997 | Yanase | |
| 5,763,831 | A | 6/1998 | Shotey et al. | |
| 5,773,760 | A | 6/1998 | Stark et al. | |
| 5,833,110 | A | 11/1998 | Chandler et al. | |
| 5,839,594 | A * | 11/1998 | Barbour | 220/3.7 |
| 5,931,325 | A | 8/1999 | Filipov | |
| 6,084,395 | A | 7/2000 | Thiel | |
| 6,133,531 | A | 10/2000 | Hayduke et al. | |
| 6,198,045 | B1 * | 3/2001 | Roesch | 174/58 |
| 6,423,897 | B1 * | 7/2002 | Roesch et al. | 174/50 |
| 6,441,307 | B1 | 8/2002 | Shotey et al. | |
| 6,476,321 | B1 | 11/2002 | Shotey et al. | |
| 6,576,835 | B1 | 6/2003 | Ford et al. | |
| 6,653,561 | B2 | 11/2003 | Lalancette et al. | |
| 6,723,922 | B1 | 4/2004 | Shotey et al. | |
| 6,737,576 | B1 | 5/2004 | Dinh | |
| 6,761,582 | B1 | 7/2004 | Shotey et al. | |
| 6,770,816 | B2 | 8/2004 | Shotey et al. | |
| 6,774,307 | B2 * | 8/2004 | Kruse et al. | 174/53 |
| 6,820,760 | B2 | 11/2004 | Wegner et al. | |
| 6,894,223 | B1 | 5/2005 | Shotey et al. | |
| 6,914,187 | B2 | 7/2005 | Hull et al. | |
| 6,955,559 | B2 | 10/2005 | Pyrros | |
| 6,979,777 | B2 | 12/2005 | Marcou et al. | |
| 6,987,225 | B2 | 1/2006 | Shotey et al. | |
| 7,038,131 | B1 | 5/2006 | Gretz | |
| 7,098,399 | B1 | 8/2006 | Gretz et al. | |
| 7,109,419 | B1 | 9/2006 | Gretz | |
| 7,259,328 | B1 | 8/2007 | Gretz | |
| 7,374,058 | B2 | 5/2008 | Dinh et al. | |
| 7,628,643 | B2 * | 12/2009 | Pyrros | 439/535 |
| 2005/0197019 | A1 | 9/2005 | Maltby et al. | |

* cited by examiner

MULTI-USE ELECTRICAL BOX

CROSS REFERENCE TO RELATED APPLICATIONS

This application is a continuation-in-part application of U.S. patent application Ser. No. 12/366,086 entitled "CONFIGURABLE ELECTRICAL BOX" TO Shotey et al. which was filed on Feb. 5, 2009, the contents of which is hereby incorporated herein by reference; this application also claims the benefit of the filing date of U.S. Provisional Patent Application 61/248,337 entitled "MULTI-USE ELECTRICAL BOX" to Shotey et al. which was filed on Oct. 2, 2009, the contents of which is hereby incorporated herein by reference.

BACKGROUND

1. Technical Field

Aspects of this document relate generally to electrical boxes.

2. Background Art

Electrical boxes are manufactured in a variety of shapes and sizes. Electrical boxes may be rectangular with one, two, three, or more gangs, each arranged to receive an electrical device. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall. If a homeowner desires electrical switches or outlets on both sides of a wall, the electrician will install a pair of electrical boxes with the openings facing opposite sides and merely offset from one another.

SUMMARY

Aspects of this document relate to electrical boxes. In one aspect, an electrical box includes a peripheral wall defining an outer perimeter and having a first end opposite a second end along a central axis, a first opening in the first end, a second opening in the second end, a dividing wall located between the first opening and the second opening; and, wherein the first opening is arranged to secure a first electrical device on a first side of a structural wall and the second opening is arranged to secure a second electrical device on a second side of the structural wall.

Particular implementations may comprise one or more of the following features. The dividing wall may be located halfway between the first opening and the second opening. The dividing wall may at least partially define two chambers. The electrical box may include a plurality of cord clamps in the dividing wall. The plurality of cord clamps may allow communication between the two chambers. A portion of the plurality of cord clamps may permit electrical wire to feed in a first direction and another portion of the plurality of cord clamps may permit electrical wire to feed in a second direction opposite the first direction. The electrical box may further include a plurality of cord clamps in the peripheral wall. The plurality of cord clamps may be in a top portion and a bottom portion of the peripheral wall.

The electrical box may also include a pair of mounting apertures for securing the electrical box to the structural wall. The mounting apertures may be located on a top portion and a bottom portion of the peripheral wall and are angled with respect to the top and bottom portions. The peripheral wall may include a predetermined depth from the first opening to the second opening approximately equal to the structural wall thickness. The predetermined depth may be approximately 4.25 inches. The electrical box may further include electrical device mounting tabs integral with the peripheral wall. The peripheral wall may be composed of a metal or a plastic. The dividing wall may at least partially define a first chamber and a second chamber, and wherein the first chamber receives a high voltage supply and the second chamber receives a low voltage supply.

In another aspect, a system for providing access to electrical devices on two sides of a structural wall including a housing having a central passage therein and terminating in a first opening at a first end and a second opening at a second end, a central divider separating the first end and the second end, a first electrical device secured to the mounting tabs at the first end and extending into the first opening, and a second electrical device secured to the mounting tabs at the second end and extending into the second opening.

In particular implementations, the central divider may further include a plurality of cord clamps. The first electrical device may be electrically connected to the second electrical device through at least one of the plurality of cord clamps. The housing may further include a plurality of cord clamps. The housing may further include a pair of mounting apertures for securing the electrical box to the structural wall.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present disclosure will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Figure 1:
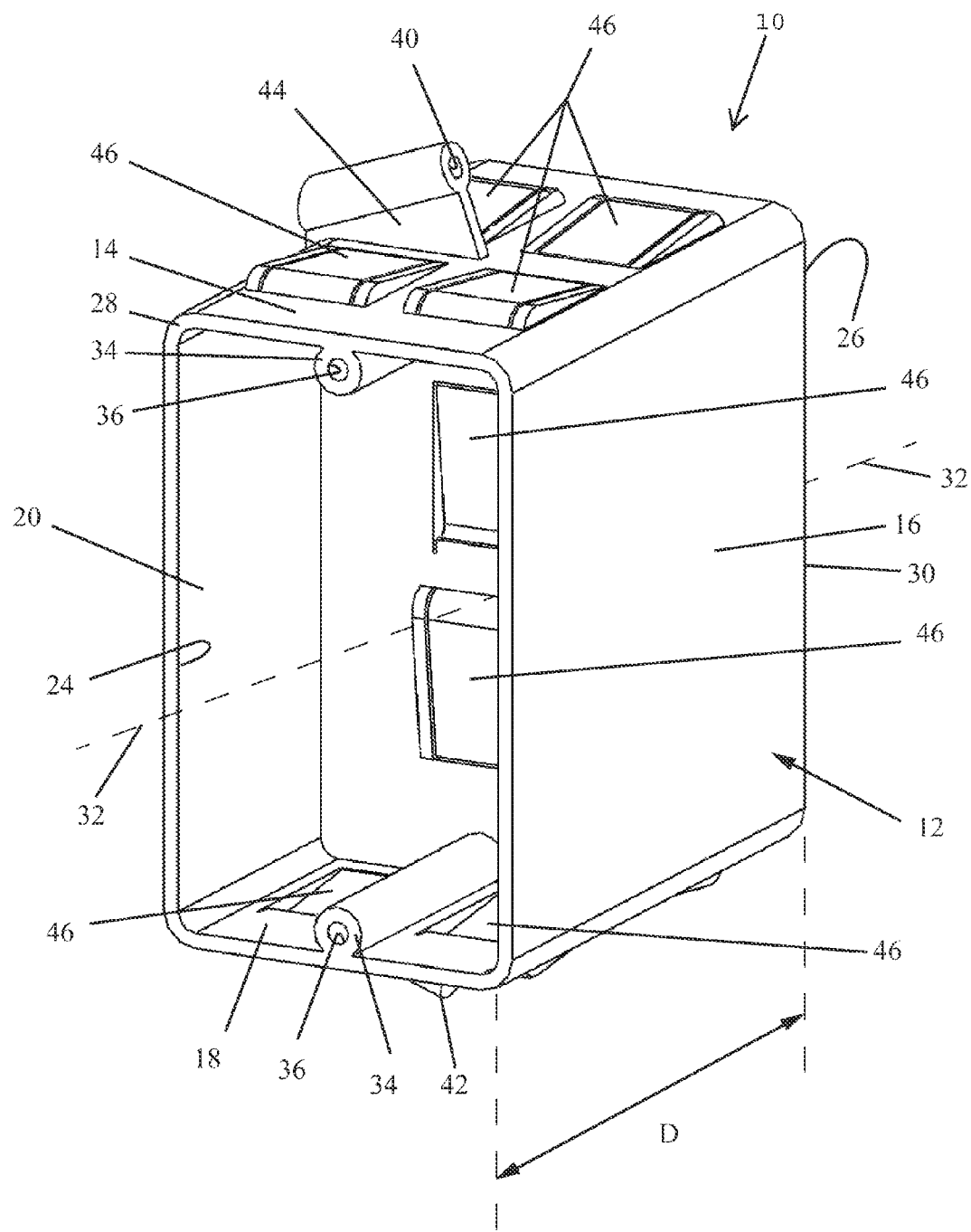
FIG. 1 is a perspective view of an electrical box.
Figure 2:
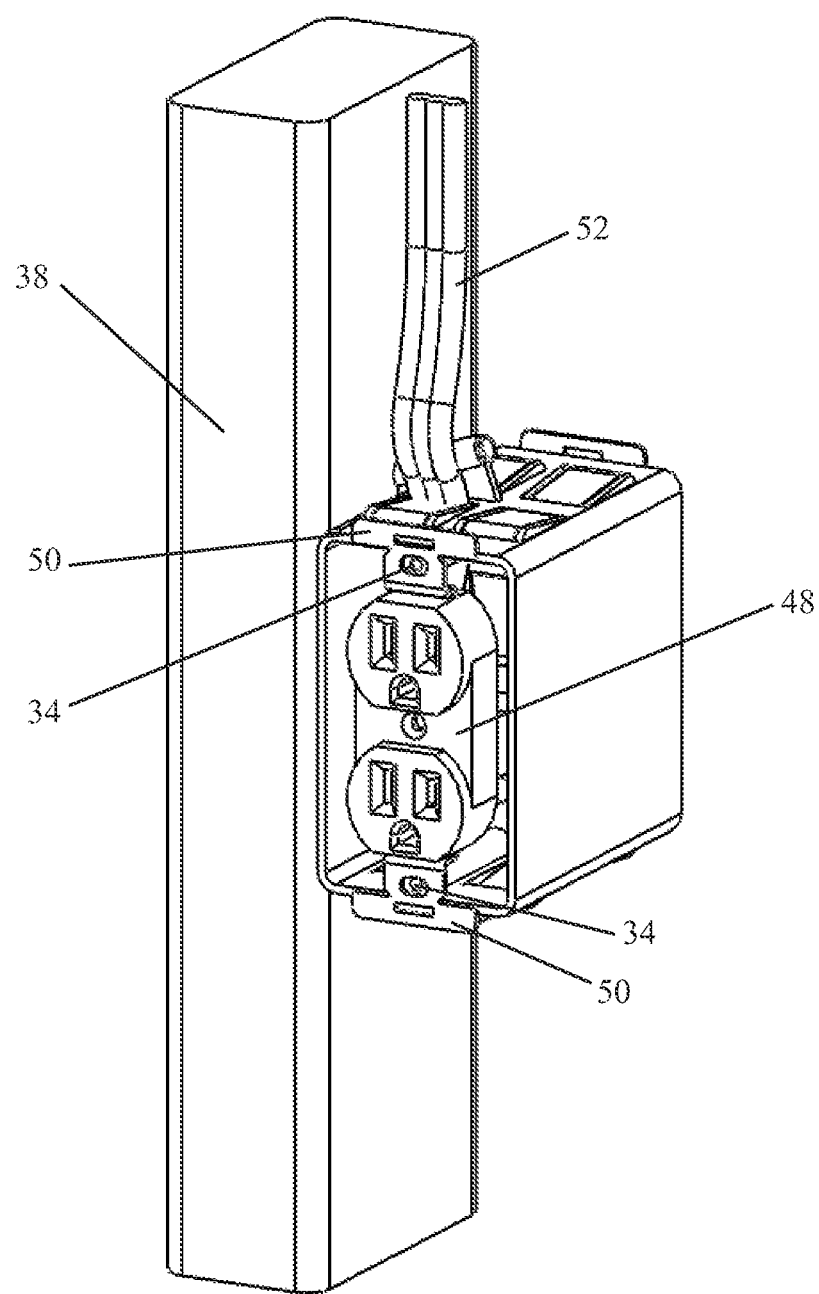
FIG. 2 is a perspective view of an electrical box mounted to a structural wall and electrical devices secured therein; and, FIG. 3 is a perspective view of an electrical box mounted to a structural wall and the electrical box peripheral wall removed.

FIGS. 1 and 2 illustrate an electrical box 10 with a housing or peripheral wall 12. Peripheral wall 12 includes a top portion 14, a right portion 16, a bottom portion 18, and a left portion 20. A divider 22 is located within peripheral wall 12 and combined define a first chamber 24 on a first side of divider 22 and a second chamber 26 on a second side of divider 22. First chamber 24 extends forward from divider 22 and terminates at a front surface 28, while second chamber 26 extends forward from divider 22 and terminates at a front surface 30. Divider 22 may be located at a point halfway between front surface 28 and front surface 30 or any position there between. Further, divider 22 may be located along a central axis 32 of electrical box 10.

Front surface 28 defines a first end and a first opening with electrical device mounting tabs 34 having holes 36, while front surface 30 defines a second end and a first opening with electrical device mounting tabs and holes. Electrical box 10 may be mounted to a structural wall 38 at upper mounting aperture 40 and lower mounting aperture 42. Specifically, the mounting apertures extend, respectively, from top portion 14 and bottom portion 18 at an angle and are offset by a spacer 44.

A plurality of cord clamps 46 are located throughout electrical box 10 and are preferably located in top portion 14, bottom portion 18, and divider 22. For example, four cord clamps 46 are located in each of the top portion, the bottom portion, and the divider in a particular implementation, although any suitable number of cord clamps may be utilized. Further, cord clamps 46 in top portion 14 and bottom portion 18 are biased to permit electrical wire to enter the first and second chambers from outside the electrical box but prevent the wire from traveling in the opposite direction. Divider 22 may have a pair of cord clamps permitting electrical wire to travel from the first chamber into the second chamber, but not the opposite direction and a second pair of cord clamps permitting electrical wire to travel from the second chamber into the first chamber, but not the opposite direction.

Still further, peripheral wall 12 may have a depth D approximately equal to the thickness of structural wall 38. The structural wall may also include drywall or plaster (not shown) on each wall, thereby increasing the thickness. Accordingly, depth D may be approximately 4.25 inches in one implementation.

FIG. 2 illustrates electrical box 10 secured to structural wall 38 and a first electrical device 48 secured within first chamber 24. Electrical device 48 is secured within the electrical box through device yokes 50 at electrical device mounting tabs 34 and holes 36. Electrical wiring 52 is fed down structural wall 38 and passes through cord clamp 46 into first chamber 24 where it is connected to first electrical device 48.

Figure 3:
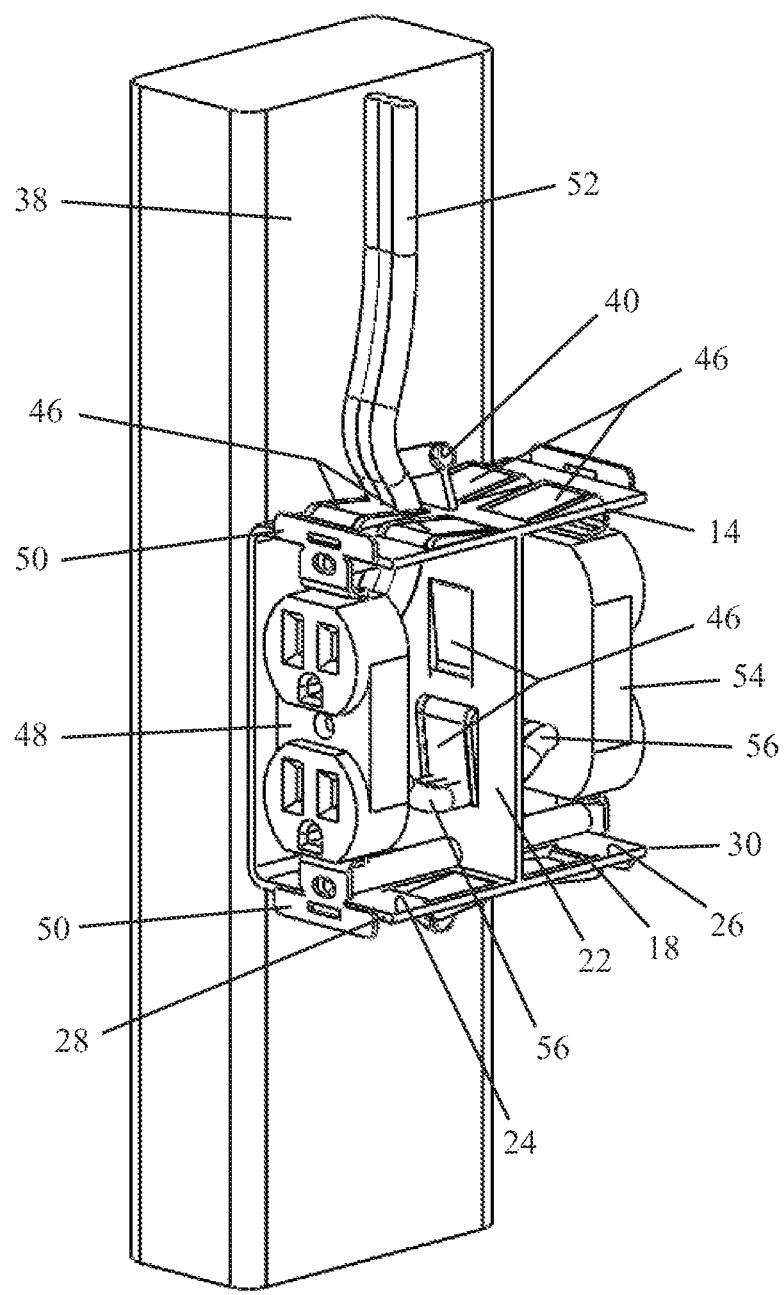

FIG. 3 illustrates electrical box 10 with right portion 16 of peripheral wall 12 removed to view second chamber 26 and a second electrical device 54. In this implementation, second electrical device 54 is daisy-chained to first electrical device with connecting electrical wire 56 secured to outlet terminals on first electrical device 48. Connecting electrical wire 56 extends from first chamber 24 through cord clamps 46 in divider 22 into second chamber 26 and ultimately line terminals of second electrical device 54.

Thus it is seen that two electrical devices can be located coaxial within a single electrical box but are accessible in different rooms. Further, only a single run of electrical wire 52 is necessary to power both electrical devices. In another aspect, dividing wall 22 provides two separate chambers and first chamber 24 may receive high voltage electrical wires through appropriate cord clamps, while second chamber 26 may receive low voltage electrical wires through appropriate cord clamps, or vice versa.

While the implementations disclosed only illustrate a single-gang back-to-back electrical box, any number of gangs may be utilized without departing from the spirit and scope.

It will be understood that implementations are not limited to the specific components disclosed herein, as virtually any components consistent with the intended operation of a method and/or system implementation for an electrical box may be utilized. Accordingly, for example, it should be understood that, while the drawing figures and accompanying text show and describe a generally rectangular electrical box, an electrical box of the present disclosure may contain any number of sides. Common electrical box shapes also include round, square, and octagonal. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical box comprising:
    a peripheral wall extending between a first end and a second end, the peripheral wall comprising a top portion, a bottom portion opposite the top portion, and at least one side portion extending between the bottom portion and the top portion;
    a first opening in the first end sized to house a first electrical device at least partially within a first chamber of the peripheral wall when the first electrical device is coupled to the first end of the peripheral wall;
    a second opening in the second end sized to house a second electrical device at least partially within a second chamber of the peripheral wall when the second electrical device is coupled to the second end of the peripheral wall; and
    a dividing wall located between the first opening and the second opening and separating the first chamber and the second chamber, the dividing wall comprising a plurality of cord clamps.

2. The electrical box of claim 1 wherein the dividing wall is located halfway between the first opening and the second opening.

3. The electrical box of claim 1, wherein the plurality of cord clamps allows communication between the two chambers.

4. The electrical box of claim 1, wherein the plurality of cord clamps comprise a first cord clamp that permits travel of electrical wire from the first chamber into the second chamber and prevents travel of electrical wire from the second chamber into the first chamber, and at least a second cord clamp that permits travel of electrical wire from the second chamber into the first chamber and prevents travel of electrical wire from the first chamber into the second chamber.

5. The electrical box of claim 4, wherein the first the first cord clamp is biased to permit travel of electrical wire from the first chamber into the second chamber and prevent travel of electrical wire from the second chamber into the first chamber, and the second cord clamp is biased to permit travel of electrical wire from the second chamber into the first chamber and prevent travel of electrical wire from the first chamber into the second chamber.

6. The electrical box of claim 1 further comprising a plurality of cord clamps in the peripheral wall.

7. The electrical box of claim 6 wherein the plurality of cord clamps are in a top portion and a bottom portion of the peripheral wall.

8. The electrical box of claim 1 further comprising a pair of mounting apertures for securing the electrical box to the structural wall.

9. The electrical box of claim 8 wherein the mounting apertures are located on a top portion and a bottom portion of the peripheral wall and are angled with respect to the top and bottom portions.

10. The electrical box of claim 1 wherein the peripheral wall includes a predetermined depth from the first opening to the second opening approximately equal to the structural wall thickness.

11. The electrical box of claim 10 wherein the predetermined depth is approximately 4.25 inches.

12. The electrical box of claim 1 further comprising electrical device mounting tabs integral with the peripheral wall.

13. The electrical box of claim 1 wherein the peripheral wall is composed of a metal or a plastic.

14. The electrical box of claim 1 wherein the first chamber receives a high voltage supply and the second chamber receives a low voltage supply.

15. A system for providing access to electrical devices on two sides of a structural wall comprising:
    a housing having a central passage therein and terminating in a first opening at a first end and a second opening at a second end;
    a central divider separating the first end and the second end;
    a plurality of cord clamps positioned on the central divider;
    a pair of mounting tabs integral to the housing at the first end and the second end;
    a first electrical device secured to the mounting tabs at the first end and extending into the first opening; and,
    a second electrical device secured to the mounting tabs at the second end and extending into the second opening.

16. The system of claim 15, wherein the first electrical device is electrically connected to the second electrical device through at least one of the plurality of cord clamps.

17. The system of claim 15 wherein the housing further comprises a plurality of cord clamps.

18. The system of claim 15 further comprising a pair of mounting apertures for securing the electrical box to the structural wall.

19. An electrical box, comprising:
    a peripheral wall comprising a top portion, a bottom portion opposite the top portion, two side portions opposite one another and extending between the top portion and the bottom portion, two chambers on opposing open ends of the peripheral wall, and at least one mounting tab positioned proximate each of the open ends, the two chambers each being sized to at least partially house a different electrical device when the electrical device is coupled to the mounting tab; and
    a divider positioned between the opposing ends of the peripheral wall and separating the two chambers, the divider comprising:
        a first cord clamp that permits travel of electrical wire from a first chamber of the two chambers into a second chamber of the two chambers and prevents travel of electrical wire from the second chamber into the first chamber; and
        a second cord clamp that permits travel of electrical wire from the second chamber into the first chamber, and prevents travel of electrical wire from the first chamber into the second chamber.

20. The electrical box of claim 19, wherein the first and the at least second cord clamps comprise biased cord clamps and the electrical box further comprises at least one biased cord clamp on the top portion of the peripheral wall and at least one biased cord clamp on the bottom portion of the peripheral wall.

* * * * *